UNITED STATES PATENT OFFICE.

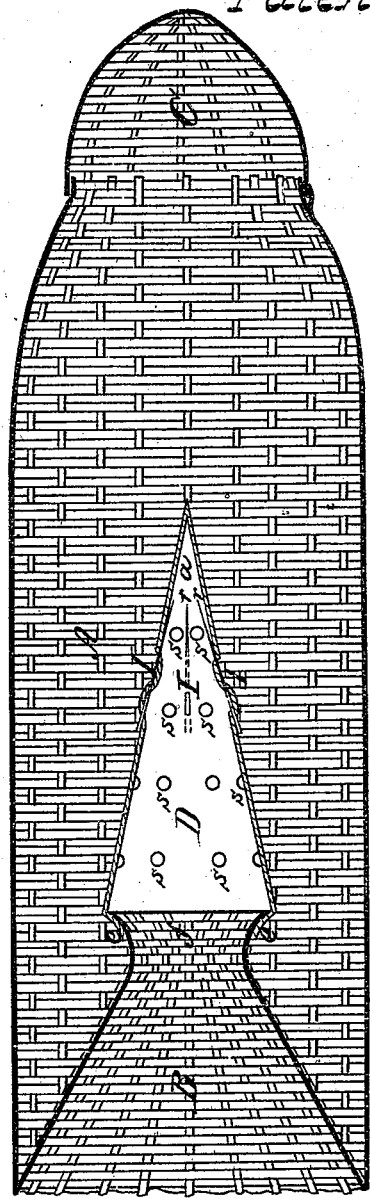

GEORGE D. ALLEN, OF NEW YORK, N. Y.

IMPROVEMENT IN EEL-POTS.

Specification forming part of Letters Patent No. 82,913, dated October 13, 1868.

To all whom it may concern:

Be it known that I, GEORGE D. ALLEN, of the city, county, and State of New York, have invented certain new and useful Improvements in Eel-Pots, and similar traps for catching animals; and that the following is a full, clear, and exact description of the same.

Eel-pots, as generally constructed, consist substantially of a basket, the entrance of which is funnel-formed, and is formed of basket-work, terminating in splints at the neck of the funnel. These splints afford a very imperfect resistance to the retrograde movements of the eels, and many of them escape, and but a small number are caught in each pot.

The object of this invention is to prevent the retreat or escape of the eels, while affording equal facilities to their entrance and to the attraction of the animal by the bait.

To this end the first part of my invention consists of an eel-pot funnel of sheet india-rubber, perforated with holes or otherwise, so that the bait can be scented by the animal, notwithstanding the impervious nature of the material of which the funnel is made.

The second part of the invention consists of an eel-pot funnel with a contracted mouth, which can be strained over the basket-work, and which will then, by contracting, hold itself in its position without the necessity of tying or other fastening.

The third part of my invention consists of the combination of the eel-pot funnel with needles pointing toward its neck, so as to pierce the animal in case it attempts to retreat when once entered in the neck of the funnel.

The fourth part of my invention consists of an eel-pot funnel having the two characteristic peculiarities of perforation and a contracted mouth.

The fifth part of my invention consists of an eel-pot body constructed with an entrance whose inner orifice is enlarged, so as to present an obstacle to the withdrawal of the funnel when engaged upon it.

The last part of my invention consists of the combination of the body of the eel-pot or trap with a funnel of india-rubber.

An eel-pot funnel constructed of india-rubber or equivalent material is more flexible, elastic, and extensible at its neck or apex than one of basket-work, and therefore presents greater facilities for the entrance of the animal. The perforations in it permit the scent of the bait to pass through, so that the animal when entering it is attracted still farther, and the needles prevent its retreat after its head has passed the apex, by pricking its sides in case of such an attempt; while the contracted mouth of the funnel and enlarged inner orifice of the entrance afford great facility for the application and removal of the flexible funnel to the basket-work.

In order that my invention may be fully understood, I will proceed to describe an eel-pot which contains all of its parts, and a longitudinal section of which is represented in the accompanying drawing.

The body A of this eel-pot and the entrance B to the funnel are formed of basket-work, with a cover, C, to close the orifice through which the animals are withdrawn. The india-rubber funnel D is slit longitudinally at its neck or apex $a$, so as to afford a passage of sufficient size for the entrance of the animals. Its mouth $e$ $e$ is contracted, and the inner part $f$ of the entrance B is enlarged at its orifice; hence the funnel-mouth may be stretched to pass over the enlarged orifice, and then by contracting applies itself firmly thereto, so that the funnel is held firmly in its place. The funnel is perforated with holes $s$, to permit the scent of the bait to pass through, and needles $i$ are quilted into it, with their points $r$ pointing toward the apex or neck $a$ of the funnel, so that they pierce the animal in case it attempts to withdraw. These needles should be formed of some metal that does not rust, or should be protected, so that their sharpness will be maintained, as their presence is important in preventing the escape of the animals after they have seized the bait.

The india-rubber which I have used in constructing my improvements is the ordinary vulcanized india-rubber, and the funnels may be made either out of the sheet-rubber by cutting it into shape and cementing its edges together, or may be constructed of the plastic compound of rubber previous to vulcanization, and be then vulcanized. Pure gum or compounds of it may be used in making the article, or the funnels may be formed of some equivalent material for india-rubber.

What I claim as my invention, and desire to secure by Letters Patent, is—

1. The eel-pot funnel of india-rubber, and perforated, substantially as above set forth.

2. The eel-pot funnel formed of india-rubber, with a contracted mouth, substantially as before set forth.

3. The combination of the eel-pot funnel with needles pointing toward its neck, substantially as before set forth.

4. The eel-pot funnel having the two characteristics of perforation and a contracted mouth, substantially as before set forth.

5. The combination of the body of the trap with a funnel of india-rubber, substantially as before set forth.

In testimony whereof I have hereto set my hand this 10th day of August, A. D. 1868.

GEO. D. ALLEN.

Witnesses:
 O. B. MARY,
 WM. J. SEXTON.